(12) United States Patent
Nelson

(10) Patent No.: US 8,470,962 B2
(45) Date of Patent: Jun. 25, 2013

(54) METHOD OF THERMOFORMING COPOLYESTERS

(75) Inventor: David E. Nelson, Hershey, PA (US)

(73) Assignee: MYCONE Dental Supply Co., Inc., Cherry Hill, NJ (US)

( * ) Notice: Subject to any disclaimer, the term of this patent is extended or adjusted under 35 U.S.C. 154(b) by 232 days.

(21) Appl. No.: 13/014,842

(22) Filed: Jan. 27, 2011

(65) Prior Publication Data
US 2012/0197002 A1    Aug. 2, 2012

(51) Int. Cl.
*C08F 6/00* (2006.01)

(52) U.S. Cl.
USPC ........ 528/503; 528/271; 528/272; 528/308.1; 528/308.2; 528/308.3; 528/480; 528/502 R

(58) Field of Classification Search
USPC ............... 528/271, 272, 308.1, 308.2, 308.3, 528/480, 483, 502 R, 503
See application file for complete search history.

(56) References Cited

U.S. PATENT DOCUMENTS

| 5,843,545 | A | * | 12/1998 | Prince ..................... 428/36.92 |
| 6,787,599 | B1 | | 9/2004 | Kuhlmann et al. |
| 2005/0227057 | A1 | | 10/2005 | Voice |
| 2005/0242472 | A1 | * | 11/2005 | Goldbach ..................... 264/458 |
| 2009/0077899 | A1 | | 3/2009 | Park et al. |

FOREIGN PATENT DOCUMENTS

| JP | 08-041187 A | 2/1996 |
| KR | 10-0700371 B1 | 3/2007 |

OTHER PUBLICATIONS

International Search Report and Written Opinion of the International Searching Authority issued on Sep. 24, 2011.
Koester, Larry, et al., "Thermoforming & Die Cutting of Recycled/Virgin PET Sheet," pp. 1-34, Lavergne Group Inc., Quebec, Canada. May 2004.
http://en.wikipedia.org/wiki/polyethylene_terephthalate, accessed Jan. 10, 2011, last modified Apr. 28, 2011.

* cited by examiner

*Primary Examiner* — Frances Tischler
(74) *Attorney, Agent, or Firm* — Michael B. Fein; Eckert Seamans Chern & Mellott, LLC

(57) ABSTRACT

A method of preventing bubble formation during or after thermoforming polyester sheet comprising heating the polyester sheet to about 100-165° F. for at least about 1 hour prior to thermoforming the sheet.

7 Claims, No Drawings

METHOD OF THERMOFORMING COPOLYESTERS

BACKGROUND OF THE INVENTION

This invention relates to the art of thermoforming plastics, especially to the art thermoforming polyesters and copolyesters.

It is well known that certain thermoformable plastics can degrade during processing. For example, when subjected to extrusion or injection molding polyethylene terephthalate is subject to hydrolytic and thermal degradation, which can lead to a reduction in impact strength and other physical properties and to thermal oxidation which causes discoloration.

Although it is known that in order to avoid decomposition of pellets of polymers which are to be extruded into thermoformable, thermoplastic sheets, a drying step is conducted before the extrusion. However, after the thermoplastic sheet is extruded, no further drying is recommended by the suppliers of the thermoformable plastic sheets. In this field of art, such extruded plastic sheets, for example extruded PETg sheets, are normally thermoformed without bubble problems. According to Wikipedia, "pre-drying [of polyethylene terethalate] is not necessary. http://en.wikipedia.org/wiki/polyethylene terephthalate, accessed Jan. 10, 2011.

In another article published by Larry Koester, Sheila Nemeth, and Mark Koester of Lavergne Group entitled "Thermoforming & Die Cutting of Recycled/Virgin PET Sheet" it is stated "PET sheet does not need any special drying prior to thermoforming, but should not be exposed to rain or water." See http://www.burchamintl.com/papers/petpapers/34gpec03.pdf accessed Jan. 14, 2011.

Depending on the manufacturer, the date the thermoformable sheets were made, possible impurities or exceptions to normal manufacturing processes, we have discovered that customers occasionally encounter bubble problems when extruding copolyester sheets such as PETg sheets. In spite of extensive research to determine the cause of such bubble formation, prior to this invention the solution to this problem has proven elusive.

It is an object of the invention to provide a solution to the bubble problem encountered with certain samples of thermoformable copolyester sheets.

A further object is to provide a process for preventing bubble formation as a result of thermoforming of polyester sheet.

SUMMARY OF THE INVENTION

These objects and others which will become apparent from the following disclosure are achieved by the present invention which comprises in one aspect a method of preventing bubble formation during or after thermoforming polyester sheet comprising heating the polyester sheet to about 100-165° F., preferably 130-160 ° F., and most preferably 145-160° F., for about one hour or more, preferably four hours or more, and preferably with air flow being applied concurrently, prior to thermoforming the sheet.

The process of the invention is especially suitable to prevent bubble formation when extruding PETg sheet but may be applied to other polyesters as well.

DETAILED DESCRIPTION

Thermoforming is a manufacturing process where a plastic sheet is heated to a pliable forming temperature, formed to a specific shape in a mold, and trimmed to create a usable product. The sheet, or "film" when referring to thinner gauges and certain material types, is heated to a high-enough temperature that it can be stretched into or onto a mold and cooled to a finished shape. Various methods of thermoforming are known. Examples include plug assist, drape forming, vacuum forming, pressure forming, and matched mold as well as other options.

Polyethylene terephthalate is a thermoplastic polymer resin of the polyester family and is used in synthetic fibers; beverage, food and other liquid containers; thermoforming applications; and engineering resins often in combination with glass fiber.

In some cases, the modified properties of copolymer are more desirable for a particular application. For example, cyclohexane dimethanol (CHDM) can be added to the polymer backbone in place of a fraction of the ethylene glycol. Since this building block is much larger (6 additional carbon atoms) than the ethylene glycol unit it replaces, it does not fit in with the neighboring chains the way an ethylene glycol unit would. This interferes with crystallization and lowers the polymer's melting temperature. Such PET is generally known as PETg (available from Eastman Chemical and SK Chemicals). PETg is a clear amorphous thermoplastic that can be injection molded or sheet extruded. It can be colored during processing.

While drying of PET and copolymers thereof is not recommended or conventional, it has been discovered that occasionally sheets are supplied by manufacturers which form bubbles upon thermoforming and that on ageing many sheets will begin to form bubbles upon thermoforming.

Such bubbles can be avoided by heating the sheets to 100-165° F., preferably 130-160° F. most preferably 145-160° F. for about 1 hour or more preferably with air flow being applied concurrently prior to thermoforming the sheet. Other temperatures and other time periods may be suitable, depending on the particular polyester copolymer being thermoformed. In some embodiments the sheet can be heated for less than an hour or longer than an hour, up to about 40 hours, although in most embodiments six hours of heating is sufficient.

EXAMPLES

The following examples illustrate a few non-limiting embodiments of the invention. All parts and percentages are by weight unless otherwise indicated.

5"×5" sheets of PETg which had been cut from lots of extruded sheet were tested for bubble formation during thermoforming using a Vacuum Forming Machine, Model Number 101, manufactured by T&S Dental and Plastics. The sheets were warmed by the heating element to softening temperature and allowed to stretch under gravitational force until a symmetrical dome of a height of 2-3.5" was formed. No effect of the height of the dome shape was observed. The number of bubbles per square inch of dome was assessed by averaging the number of bubbles in four 1 inch square segments of the dome. Table 1 gives the results.

TABLE 1

| Example | Sheet Lot[1] | Sheet Thickness, inches | Treatment[2] | Number of Bubbles Square Number 1 | 2 | 3 | 4 | Average[3] | Remarks[4] |
|---|---|---|---|---|---|---|---|---|---|
| 1 | 1 | 0.08 | None | 23 | 44 | 33 | 41 | 35.25 | L, S |
| 2 | 1 | 0.08 | None | 30 | 37 | 25 | 35 | 31.75 | L, S |
| 3 | 1 | 0.08 | None | 26 | 37 | 40 | 30 | 33.25 | L, S |
| 4 | 1 | 0.08 | None | 42 | 35 | 44 | 38 | 39.75 | L, S |
| 5 | 1 | 0.08 | A | 12 | 17 | 14 | 11 | 13.5 | L, S |
| 6 | 1 | 0.08 | B | 0 | 0 | 1 | 0 | 0.25 | S |
| 7 | 1 | 0.08 | C | 0 | 1 | 0 | 2 | 0.75 | S |
| 8 | 1 | 0.08 | D | 0 | 0 | 0 | 0 | 0 | |
| 9 | 2 | 0.08 | None | NM | NM | NM | NM | NM | F |
| 10 | 2 | 0.08 | A | NM | NM | NM | NM | NM | LF |
| 11 | 2 | 0.08 | B | 0 | 0 | 0 | 0 | 0 | |
| 12 | 2 | 0.08 | C | 14 | 33 | 36 | 17 | 25 | S |
| 13 | 2 | 0.08 | D | 0 | 0 | 0 | 0 | 0 | |
| 14 | 3 | 0.04 | None | 62 | 52 | 52 | 63 | 57.25 | L, S |
| 15 | 3 | 0.04 | E | 1 | 0 | 0 | 0 | 0.25 | S |
| 16 | 3 | 0.04 | F | 5 | 1 | 1 | 1 | 3 | S |
| 17 | 4 | 0.06 | None | 22 | 26 | 30 | 33 | 27.75 | L, S |
| 18 | 4 | 0.06 | E | 1 | 6 | 3 | 5 | 3.75 | S |
| 19 | 4 | 0.06 | F | 0 | 1 | 1 | 1 | 0.75 | S |

[1]Lot of extruded sheet that the 5" × 5" sheet was cut from
1, 2 - 25" × 50", 0.080" thickness sheet from Industrial Custom Products, Minneapolis, MN
3 - 5" × 5", 0.040" sheets received from sheets received from Acrilex, inc., Jersey City, NJ
4 - 5" × 5", 0.060" sheets received from sheets received from Acrilex, inc., Jersey City, NJ
[2]A - Sheet was placed in the column oven of a Hewlett Packard 6890 Gas Chromatograph at 150° F. for 4 hours
B - Sheet was placed in the column oven of a Hewlett Packard 6890 Gas Chromatograph at 150° F. for 16 hours
C - Sheet was placed in a VWR Laboratory Oven, Model E1320 at 150° F. for 4 hours
D - Sheet was placed in a VWR Laboratory Oven, Model E1320 at 150° F. for 16 hours
E - Sheet was placed in a Black and Decker Home, Perfect Broil Covection Oven, Model - CTO45005 for 6 hours
F - Sheet was placed in a Black and Decker Home, Perfect Broil Covection Oven, Model - CTO4500S for 8 hours
[3]NM-Not measurable due to frosted appearance
[4]L-Large bubbles, S-Small bubbles, F-Frosted appearance, LF-Frosted appearance with some transparent areas The present invention, therefore, is well adapted to carry out the objects and attain the ends and advantages mentioned, as well as others inherent therein. While the invention has been depicted and described and is defined by reference to particular preferred embodiments of the invention, such references do not imply a limitation on the invention, and no such limitation is to be inferred. The invention is capable of considerable modification, alteration and equivalents in form and function, as will occur to those ordinarily skilled in the pertinent arts. The depicted and described preferred embodiments of the invention are exemplary only and are not exhaustive of the scope of the invention. Consequently, the invention is intended to be limited only by the spirit and scope of the appended claims, giving full cognizance to equivalents in all respects.

What is claimed is:

1. A method of preventing bubble formation during or after thermoforming polyester sheet comprising heating the polyester sheet to about 100-165° F. for at least about 1 hour prior to thermoforming the sheet, said thermoforming consisting of heating the sheet to a pliable forming temperature, forming the sheet to a specific shape in a mold, and trimming the sheet to create a usable product.

2. The method of claim 1 comprising heating the sheet to about 130-160° F. for at least one hour prior to thermoforming the sheet.

3. The method of claim 1 comprising heating the sheet to about 145-160° F. for at least one hour prior to thermoforming the sheet.

4. The method of claim 1 comprising heating the polyester sheet to about 100-165° F. for about 1-40 hours prior to thermoforming the sheet.

5. The method of claim 1 wherein the polyester sheet is PETg copolymer.

6. The method of claim 1 wherein air flow is applied concurrently with the heating.

7. The method of claim 1 wherein the sheet is heated to a high-enough temperature so that it can be stretched into or onto a mold and cooled to a finished shape.

* * * * *